C. E. ANDERSSON.
AUTOMOBILE SLEIGH RUNNER.
APPLICATION FILED APR. 16, 1914.
1,127,157.
Patented Feb. 2, 1915.
3 SHEETS—SHEET 1.
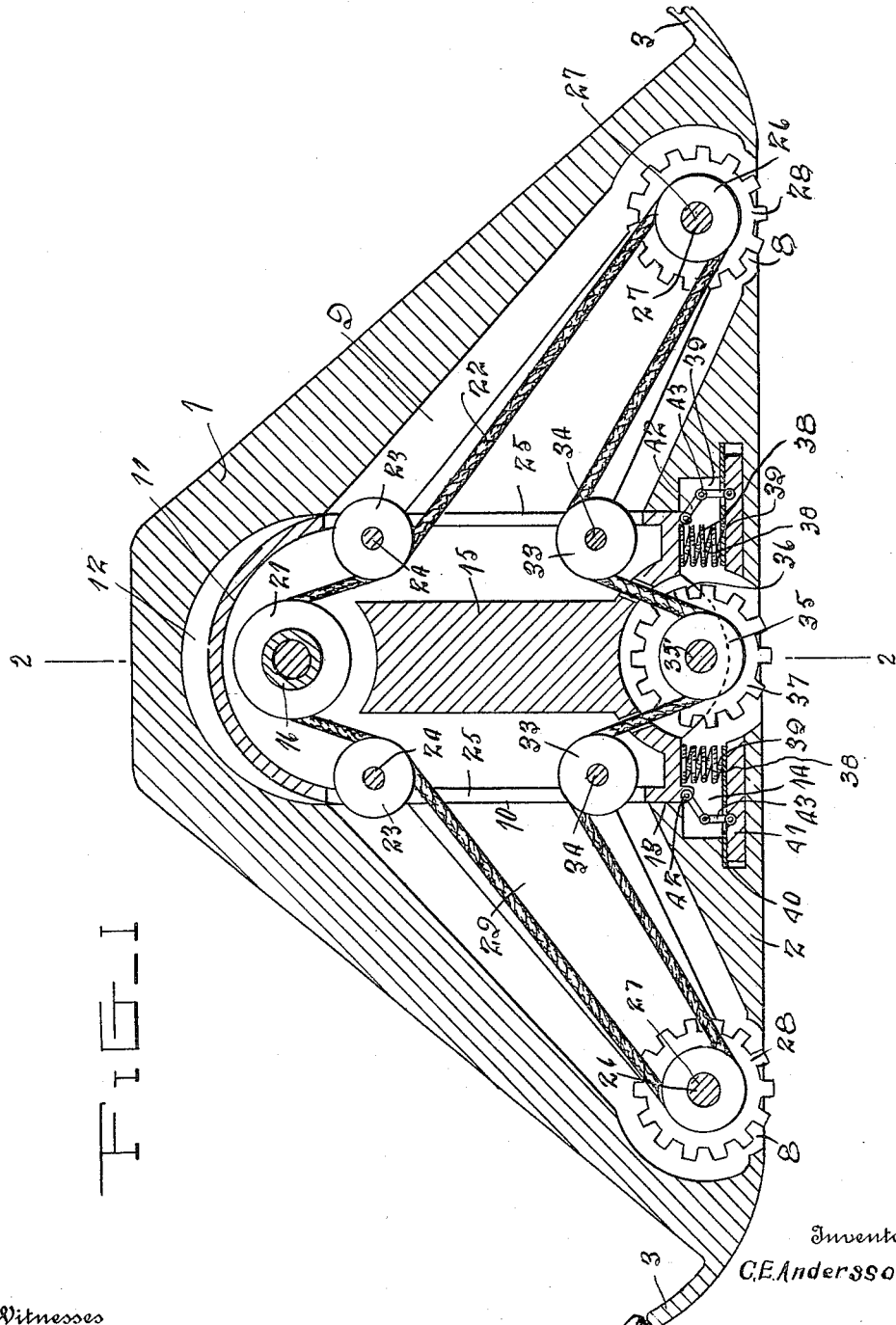
Witnesses
Chas. H. Trotter.
Wm. S. Fowler.
Inventor
C.E. Andersson
By 
Attorney

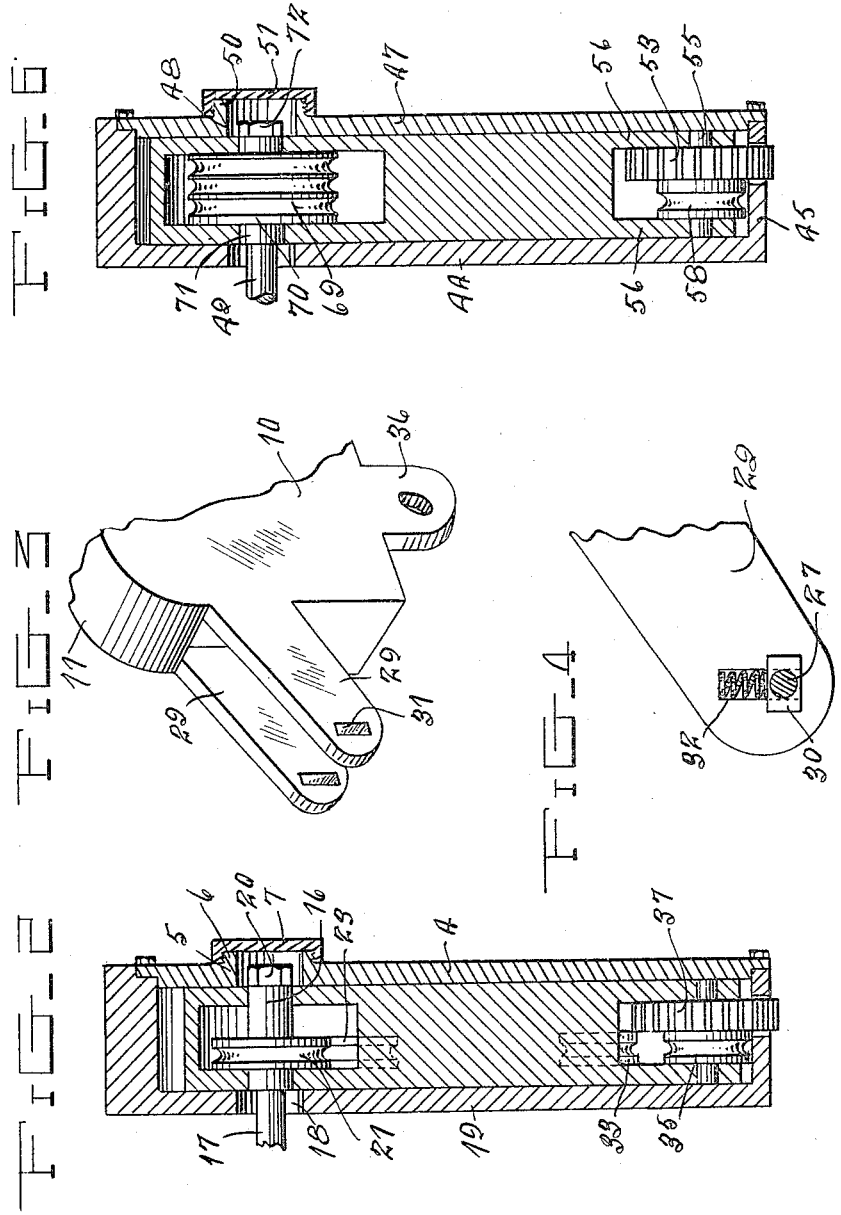

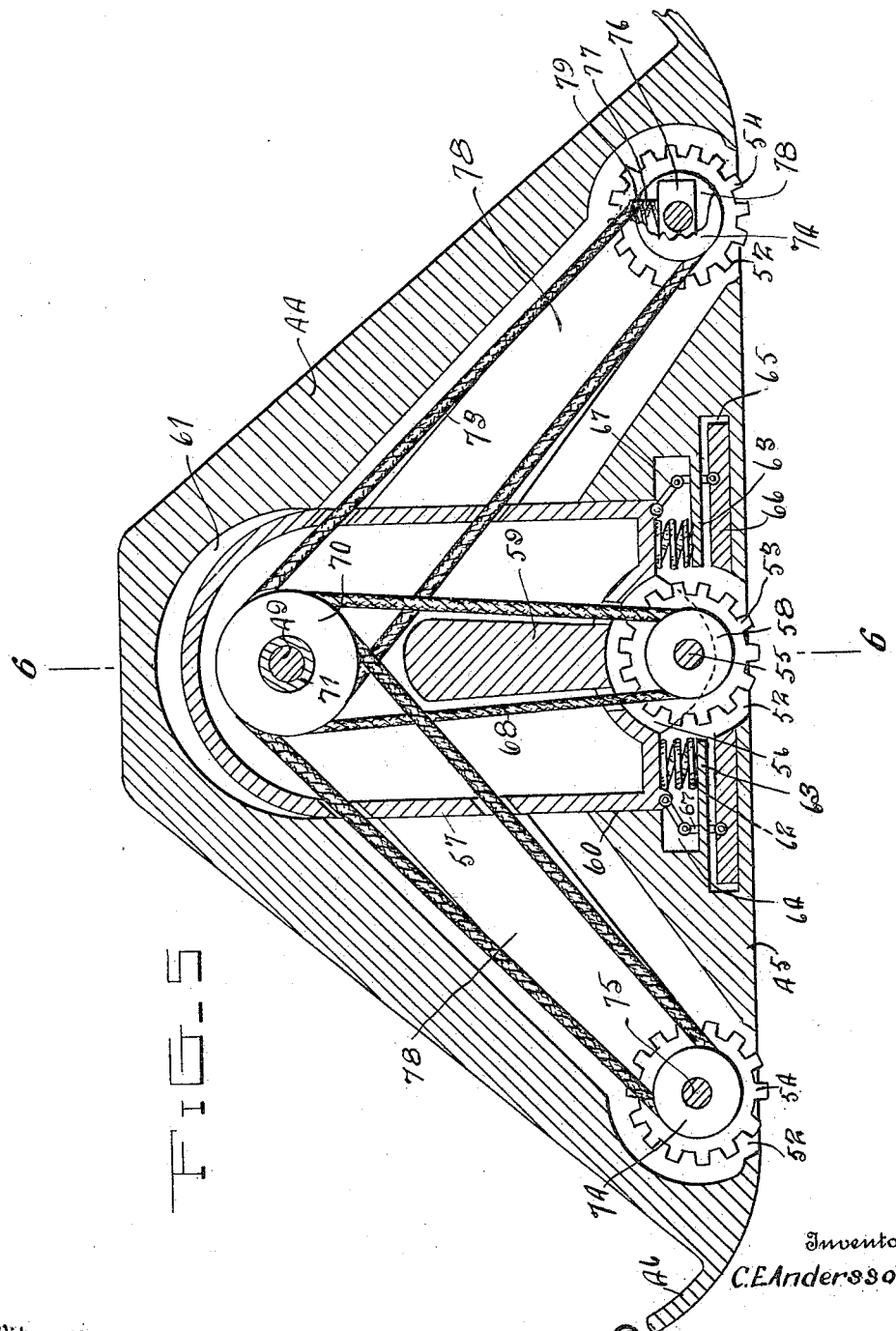

UNITED STATES PATENT OFFICE.

CARL ERIK ANDERSSON, OF DULUTH, MINNESOTA, ASSIGNOR OF ONE-HALF TO LUDWIG A. LARSEN, OF DULUTH, MINNESOTA.

AUTOMOBILE SLEIGH-RUNNER.

1,127,157. Specification of Letters Patent. Patented Feb. 2, 1915.

Application filed April 16, 1914. Serial No. 832,283.

*To all whom it may concern:*

Be it known that I, CARL ERIK ANDERSSON, a citizen of the United States, residing at Duluth, in the county of St. Louis and State of Minnesota, have invented certain new and useful Improvements in Automobile Sleigh-Runners, of which the following is a specification.

This invention comprehends certain new and useful improvements in automobile sleigh runners and has for its primary object to provide a device of this character which will be of extremely simple construction and operation, as well as highly efficient in use.

Another object is to provide a device of this character including surface engaging toothed wheels, means for rotating said wheels and means for resiliently retaining said wheels in normal position.

Another object is to provide a device of this character which will be constructed in such manner that the surface engaging toothed wheels may extend through the runner proper and may be mounted in movable supports, whereby said wheels may move upwardly upon engagement of said wheels with a stone or other obstruction in the path of the runner.

A further object of this invention is to provide a sleigh runner which may be readily mounted upon the axles of an automobile in such manner that the surface engaging toothed wheels will be operated by rotation of the driven axle, as will be readily understood.

This invention has for a still further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a longitudinal section through a sleigh runner constructed in accordance with my invention, Fig. 2 is a transverse sectional view on the line 2—2 of Fig. 1, Fig. 3 is a detail perspective view of a portion of the movable casting with a pair of arms projecting at an angle from one side thereof, Fig. 4 is a fragmentary detail view of one of the arms with the axle mounted therein for supporting one of the surface engaging toothed wheels, Fig. 5 is a view similar to Fig. 1, showing a slightly modified form of my invention, and Fig. 6 is a transverse vertical section on the line 6—6 of Fig. 5.

Referring in detail to the drawings by numerals, 1 designates the casting forming the casing for the movable parts of the device and having its bottom constructed to form the runner proper 2 with the opposite ends 3 curved upwardly, as clearly shown in Fig. 1. It will be understood that the central portion of the casting 1 is hollow and that one side is open and adapted to be closed by the removable side plate 4 which has an axle opening 5 near its upper central portion and a threaded flange 6 extended outwardly from around said opening to receive the removable cap 7, the purpose of which will presently appear.

The runner proper 2 has a series of openings 8 therein, preferably three in number, the purpose of which will presently be clearly apparent. The openings 8 communicate with the hollow interior of the casting 1 and the hollow interior corresponds to the substantially triangular shape of the casting 1. The hollow interior of the casting 1 forms a chamber 9 for the vertically movable casting 10 which has a rounded upper portion 11 for sliding movement in the rounded upper portion 12 of the chamber 9. The vertically movable casting 10 is guided by engagement of its upper curved end 11 in the upper curved end 12 of the chamber 9 and by engagement of the lower end of said casting 10 in the guide opening 13 in the lower portion of the casting 1 and connecting the chamber 9 with the lower chamber 14 in the bottom central portion of said casting and located around the central opening 8 in the runner proper. The vertically movable casting 10 is preferably hollow and has the central core 15 connecting the opposite sides thereof and serving to reinforce said casting 10. Mounted transversely in the upper portion of the casting 10 and extending through the same is a rotatable sleeve 16 which is adapted to receive one end 17 of an axle of an automobile or the like, a suitable opening 18 being provided in the side 19 of the casting 1, opposite the opening 5 in the removable side plate 4. It will be understood that after the end 17 of the axle has been inserted through the sleeve 16, and keyed in any suitable manner, not shown, with the sleeve 19 to cause rotation of the latter with said axle, the nut 20 is secured upon the extremity of the latter to prevent withdrawal of the same.

Mounted upon the sleeve 16 is a drive pulley wheel 21, around which is engaged a continuous drive belt 22 which passes around the lower portions of the small guide pulley wheels 23 mounted upon the stationary shafts 24 positioned transversely in the vertically movable casting 10, adjacent the opposite sides thereof and below the curved upper end 11 of said vertically movable casting 10. The continuous drive belt 22 then passes out of the opposite sides of the vertically movable casting 10, by way of the elongated longitudinal slots 25 in opposite sides of said casting 10. The continuous drive belt 22 is then engaged around each of the pulley wheels 26 mounted upon the end shafts 27 which also carry the forward and rear surface engaging toothed wheels 28.

It will be understood that each shaft 27 is mounted transversely in the lower extremities of a pair of downwardly inclined arms 29 secured to one side of the vertically movable casting 10 along the longitudinal edges of the vertical elongated openings 25. The opposite ends of the shafts 27 are mounted in suitable boxings 30 which are resiliently retained in the lower ends of the vertical elongated slots 31 in the free extremities of the arms 29, by helical springs 32 or other suitable means.

After passing around the front and rear surface engaging toothed wheels 28, the continuous drive belt 22 is passed over the lower guide pulley wheels 33 spaced below the guide pulley wheels 23 and mounted upon the shafts 34 parallel with the shafts 24. It will be understood that the shafts 34 also positioned transversely of the vertically movable casting 10 adjacent the elongated longitudinal openings 25, and that the continuous drive belt 22 enters said casting 10 through said openings 25 before being passed around said guide pulley wheels 33 and is then extended downwardly and engaged around the lower pulley wheel 35 mounted between the depending parallel ears 36 and carried by said vertically movable casting 10 and forming a part thereof, the shaft 35′ for said wheel 35 also having mounted thereon the central surface engaging toothed wheel 37, the teeth of which extend through the central opening 8 in the runner proper 2 when the vertically movable casting is in its normal or lowermost position.

The vertically movable casting 10 is resiliently retained in its lowermost position by means of the helical springs 38 positioned to opposite sides of the ears 36 and having their upper ends secured to the bottom of said vertically movable casting 10, while their lower ends are secured to the horizontal partition walls 39 serving to separate the lower chamber 14 of the casting 1 from the chambers 40 immediately beneath the same and within which are positioned the slidable closure plates 41. The slidable closure plates are moved inwardly toward one another by means of the bell crank levers 42 mounted upon the pivot pins 43 positioned transversely in the lower chamber 14, the upper ends of said bell crank levers 42 being connected with the bottom of the vertically movable casting 10, while the lower ends of said bell crank levers are connected with said movable closure plates 41. It will be understood that upward movement of the vertically movable casting 10 against the tension of the helical springs 38, is caused by engagement of the central surface engaging toothed wheel 37 with an obstruction or raised portion of the surface over which the runner is traveling, and as this wheel 37 is forced upwardly to cause upward movement of the vertically movable casting 10, the bell crank levers 42 will be operated to force the slidable closure plates 41 inwardly and thereby decrease the size of the central opening 8 and prevent large lumps of ice, hardened snow, stones, et cetera, from entering the central opening and thereby preventing proper operation of the device.

In Figs. 5 and 6 I have shown a modified form of the device in which I have provided an outer casting 44 of substantially the same construction as in the preferred form and having its lower portion formed to serve as the runner proper 45 with its opposite ends 46 extended slightly and curved upwardly to prevent the ends of the runner from catching in the surface over which the device is traveling, the same as in the preferred form. This casting 44 is also hollow and has one side open and adapted to be closed by the removable side plate 47 having an axle opening 48 to accommodate the extremity of the axle 49, as will be later clearly understood, an outwardly extended circular flange 50 being formed around the opening 48 and exteriorly threaded to receive the threaded cap 51 for closing the outer end of said opening 48.

The runner proper 45 is provided with central and end openings 52 through which are engaged the teeth of the toothed surface engaging wheels 53 and 54, the wheel 53 being mounted upon the central lower shaft 55 mounted transversely in the depending parallel ears 56 of the vertically movable casting 57. A belt wheel 58 is also mounted upon the central shaft 55 and it will be understood that said belt wheel 58 and the central surface engaging wheel 53 are positioned between the depending ears 56. The vertically movable casting 57 has a solid reinforcing central rib 59 and said vertically movable casting 57 is guided within the casting 44 by engagement of the lower portion thereof in the guide opening 60, while its upper curved portion is engaged in the curved guide opening 61 in the upper end of the casting 44. The vertically movable casting 57 is resiliently retained in its lowermost position by the helical springs 62 which have their upper ends secured to the bottom of said casting 57, while their lower ends are secured to the transverse partitions 63 between the lower compartments 64 in the casting 44 and the closure plate recesses 65 within which are positioned the slidable closure plate 66 adapted to be forced inwardly toward one another to decrease the size of the central opening 52, by means of the bell crank levers 67, upon upward movement of the central surface engaging wheel 53 and the vertically movable casting 57, owing to engagement of said central surface engaging wheel 53 with an obstruction or raised portion of the surface over which the runner proper 45 is traveling. As the bell crank levers 67 have their upper ends secured to the bottom of the vertically movable casting 57, while their lower ends are secured to the slidable closure plates 66, it will be readily seen that upon downward movement of the vertically movable casting 57, said closure plates 66 will be returned to normal position. Rotation of the central surface engaging toothed wheel 53 is caused by a drive belt 68 which is engaged around the belt wheel 58 and also passed around one of the grooves 69 of the triple pulley wheel 70 which is mounted upon the sleeve 71 positioned in the upper end of the vertically movable casting 57 and through which the end of the axle 49 is engaged to rotate said sleeve 71. It will be understood that the axle 49 has a nut 72 secured upon the same after being engaged through the sleeve 71, said nut 72 extending into the opening 48. A drive belt 73 is engaged in each of the remaining grooves 69 of the triple belt wheel 70 and engaged around one of the belt wheels 74 mounted upon the shafts 75 upon which the outer or end surface engaging toothed wheels 54 are mounted. It will therefore be seen that three drive belts are employed, one extending from the triple drive belt 70 to each of the surface engaging toothed wheels. Each shaft 75 is mounted in the bearings 76 which are slidably positioned in the vertical elongated bearing openings 77 provided in the outer ends of a pair of downwardly inclined supporting arms 78 projecting from one side of the vertically movable casting 57, and said bearings 76 are resiliently retained at the lower ends of said openings by means of the springs 79 positioned in said bearing openings 77. Should either of the surface engaging toothed wheels 54 come in contact with a raised portion of the surface or other obstruction, said wheel, together with the shaft 75 upon which it is mounted, will be forced against the tension of the springs 79. It will be understood that the vertically movable casting 57 is provided with suitable openings through which the belts 68 and 73 may pass.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

1. A device of the class described comprising a runner including an outer casing, a slidable casing within said outer casing, a drive pulley mounted in said slidable casing, said slidable casing having depending portions, said outer casing having openings formed therein, surface engaging wheels carried by the depending portions of the slidable casing and projecting through the openings of the outer casing, and connections between the drive pulley and the surface engaging wheels to operate the latter.

2. A device of the class described comprising a runner including a casing, a movable member within said casing, said casing having its lower portion constructed to form a runner proper, the runner proper being provided with openings, said movable member having depending parallel portions, shafts mounted in said depending parallel portions, surface engaging wheels mounted upon said shafts, pulleys mounted upon said shafts, a drive pulley mounted in said movable member, means for rotating said drive pulley, and drive means engaged around said drive pulley and the first mentioned pulleys.

In testimony whereof I affix my signature in presence of two witnesses.

CARL ERIK ANDERSSON.

Witnesses:
 ELLA SALTURCK,
 F. W. JANSEN.